United States Patent
Fujinaka

(10) Patent No.: US 8,742,324 B2
(45) Date of Patent: Jun. 3, 2014

(54) STRUCTURE FOR SHIELDING A GAP BETWEEN MEMBERS

(75) Inventor: Hiroyasu Fujinaka, Osaka (JP)

(73) Assignee: Panasonic Corporation, Osaka (JP)

( * ) Notice: Subject to any disclaimer, the term of this patent is extended or adjusted under 35 U.S.C. 154(b) by 423 days.

(21) Appl. No.: 13/158,591

(22) Filed: Jun. 13, 2011

(65) Prior Publication Data

US 2011/0303833 A1     Dec. 15, 2011

(30) Foreign Application Priority Data

Jun. 14, 2010 (JP) .................................. 2010-134768
May 27, 2011 (JP) .................................. 2011-119593

(51) Int. Cl.
*H01J 40/14* (2006.01)
*H01J 5/02* (2006.01)

(52) U.S. Cl.
USPC ......... 250/239; 250/208.1; 257/433; 257/435

(58) Field of Classification Search
USPC ......... 250/208.1, 214.1, 214 DC, 208.2, 239, 250/226; 257/431, 432, 433, 434, 435
See application file for complete search history.

(56) References Cited

U.S. PATENT DOCUMENTS

2003/0025825 A1* 2/2003 Nakajoh ..................... 348/374
2008/0197268 A1* 8/2008 Kameda .................... 250/208.1

FOREIGN PATENT DOCUMENTS

| JP | 59-035005 | 3/1984 |
| JP | 60-003632 | 1/1985 |
| JP | 60-004376 | 1/1995 |
| JP | 11-265957 | 9/1999 |
| JP | 2005-181541 | 7/2005 |
| JP | 2006-100878 | 4/2006 |
| JP | 2008-023716 | 2/2008 |
| JP | 2008-205723 | 9/2008 |

* cited by examiner

*Primary Examiner* — Francis M Legasse, Jr.
(74) *Attorney, Agent, or Firm* — Renner, Otto, Boisselle & Sklar, LLP

(57) ABSTRACT

An imaging device support structure includes a master flange having an opening portion through which an optical axis A passes, an imaging device which is attached to the master flange via the attachment plate and is positioned in the opening portion as viewed in an optical axis A direction, and a shielding member which shields a gap between the master flange and the imaging device in the opening portion. The shielding member is pressed against the opening edge of the first opening portion. The opening edge of the first opening portion has a substantially polygonal shape with corner portions which outwardly protrude.

14 Claims, 17 Drawing Sheets

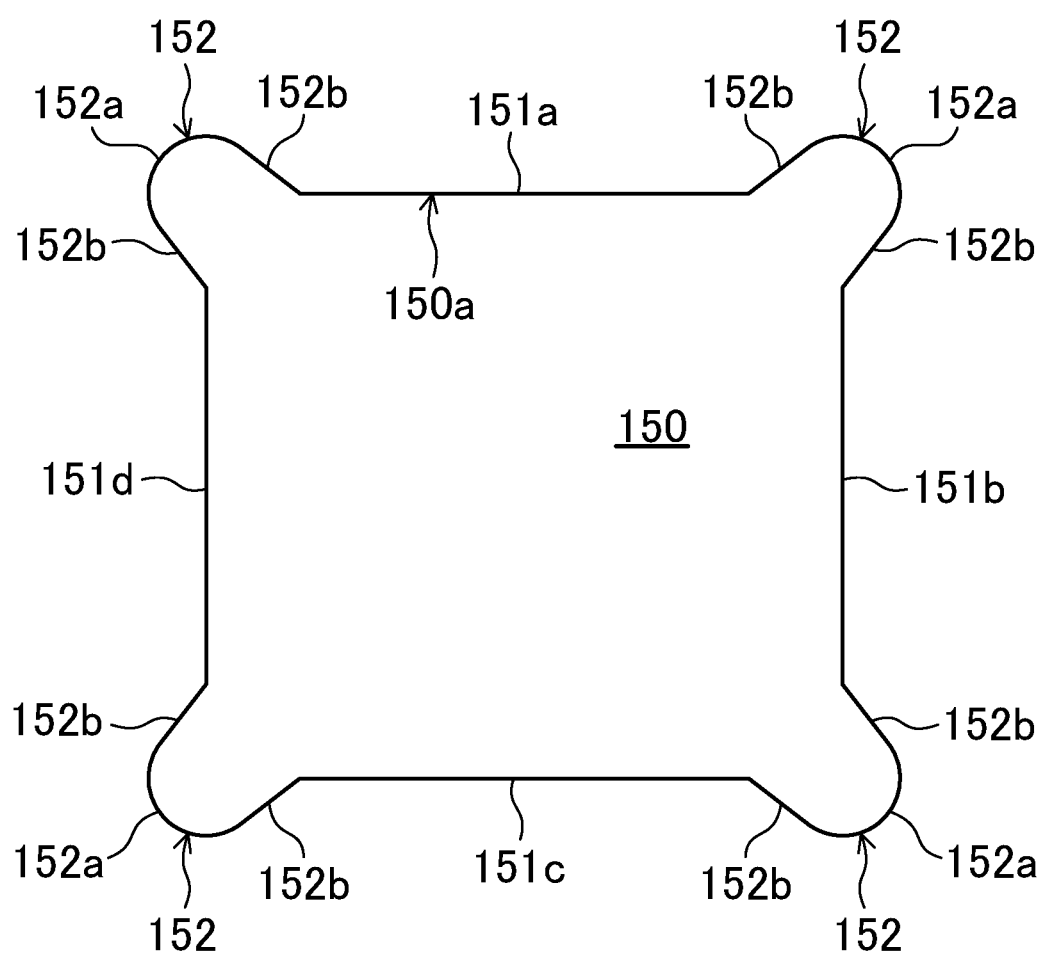

US 8,742,324 B2

STRUCTURE FOR SHIELDING A GAP BETWEEN MEMBERS

CROSS-REFERENCE TO RELATED APPLICATION

This application claims priority to Japanese Patent Application No. 2010-134768 filed on Jun. 14, 2010, the entire disclosure of which is incorporated by reference herein. In addition, this application is related to Japanese Patent Application No. 2011-119593 filed on May 27, 2011, the entire disclosure of which is incorporated by reference herein.

BACKGROUND

The present disclosure relates to a shielding structure for shielding an opening portion, and an imaging device support structure.

Conventionally, as a shielding structure for shielding an opening portion such as a gap, etc., various structures have been known. One of such structures is a shielding structure in an imaging device support structure.

For example, in an imaging device support structure according to Japanese Patent Publication No. 2008-205723, a mask member, a low-pass filter, a protective member, an imaging device, a holding member, and a flexible print substrate are provided in this order at the back side of a CCD holder. The protective member spreads toward the imaging device like a skirt. An inner edge (a front edge) of the protective member contacts the low-pass filter, and an outer edge (a rear edge) of the protective member contacts the holding member. The imaging device is located inside the protective member and is fixed to the holding member via an adhesive. The holding member is attached to the CCD holder via a plurality of screws. Thus, the protective member shields a gap between the low-pass filter and the holding member so that a foreign substance such as dust and dirt do not enter an imaging plane of the imaging device.

SUMMARY

In the imaging device support structure of Japanese Patent Publication No. 2008-205723, a tilt of the imaging device is adjusted by adjusting a tightening amount of the plurality of screws. However, in this structure, twists and warps might be formed in the protective member depending on the tightening amount of the screws. The above-described twists and warps might cause positional shifts between the protective member and the low-pass filter or between the protective member and the holding member. When such positional shifts occur, foreign substances such as dust and dirt can enter from the outside and attach to the imaging plane of the imaging device.

In view of the foregoing, techniques disclosed herein have been devised, and it is an object of the present disclosure to prevent or reduce, in a structure in which a shielding member for shielding an opening portion such as a gap, etc. is placed while being pressed, formation of a large gap due to twists and warps in the shielding member.

A shielding structure according to the present disclosure includes a first member having an opening portion through which an axis passes, a shielding member which shields the opening portion, and a second member which presses a part of the shielding member located inside the opening portion toward the first member along a direction of the axis, and an opening edge of the opening portion has a substantially polygonal shape with corner portions which outwardly protrude.

An imaging device support structure according to the present disclosure includes a master flange having an opening portion through which an optical axis passes, an imaging device which is directly or indirectly attached to the master flange and is positioned in the opening portion as viewed in a direction of the optical axis, and a shielding member which shields a gap between the master flange and the imaging device in the opening portion, the shielding member is pressed against an opening edge of the opening portion along the direction of the optical axis, and the opening edge of the opening portion has a substantially polygonal shape with corner portions which outwardly protrude.

Furthermore, another imaging device support structure according to the present disclosure includes a master flange having an opening portion through which an optical axis passes, an attachment member attached to the master flange, an imaging device which is attached to the attachment member and is positioned in the opening portion as viewed in a direction of the optical axis, and a shielding member which shields a gap between the master flange and the attachment member in the opening portion, the shielding member is pressed against an opening edge of the opening portion along the direction of the optical axis, and the opening edge of the opening portion has a substantially polygonal shape with corner portions which outwardly protrude.

In the shielding structure, even when the shielding member is pressed by the second member, a space in which the shielding member spreads out can be provided in each corner portion of the opening portion, and thus, twists and warps in the shielding member are reduced. As a result, a gap between the shielding member and the first member can be prevented or reduced.

Moreover, in the imaging device support structures, even when the shielding member is pressed against the opening edge of the opening portion, a space in which the shielding member spreads out can be ensured in each corner portion of the opening portion, and thus, twists and warps in the shielding member are reduced. As a result, the gap between the shielding member and the opening edge of the opening portion can be prevented or reduced.

BRIEF DESCRIPTION OF THE DRAWINGS

FIG. 19 is a front view of a first opening portion according to a fourth variation.

DETAILED DESCRIPTION

Example embodiments will be described below.

<<First Embodiment>>

Figure 1:
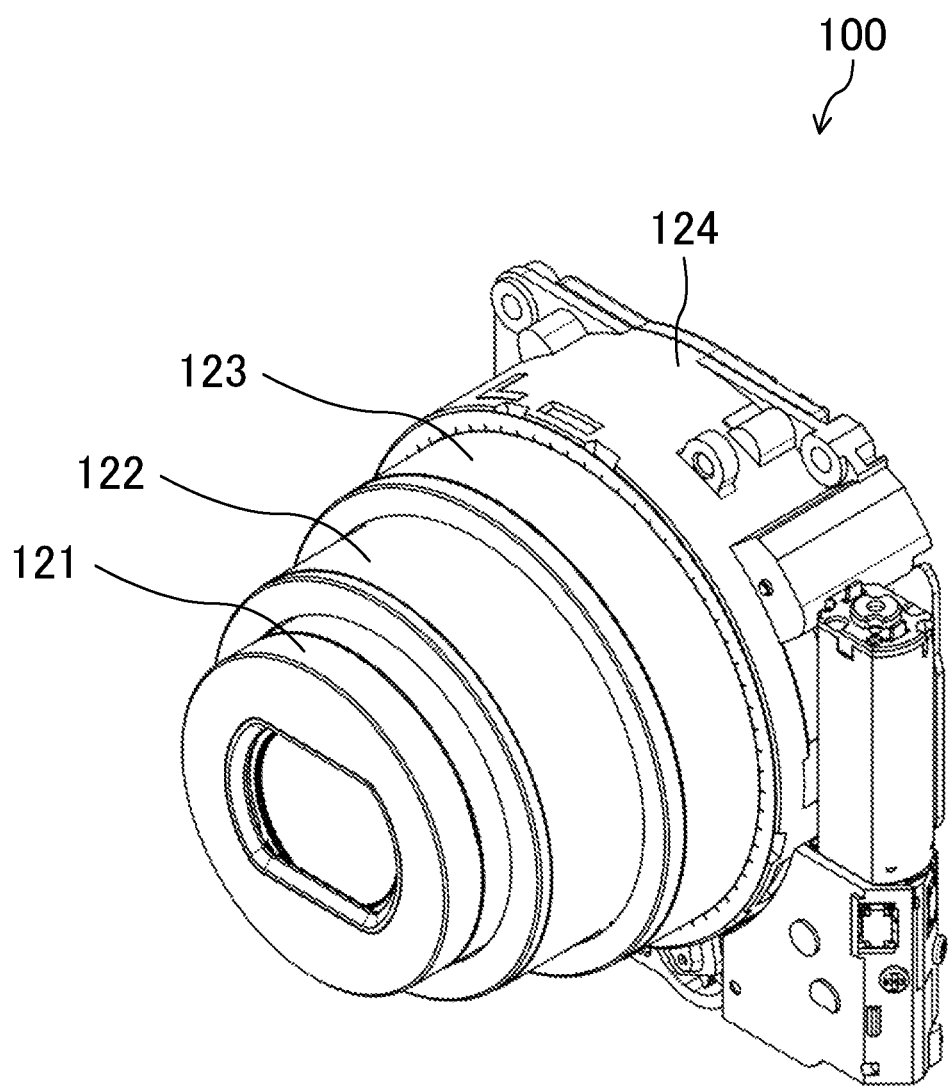
FIG. 1 is a perspective view of a lens barrel according to a first embodiment as viewed obliquely from the front.
Figure 2:
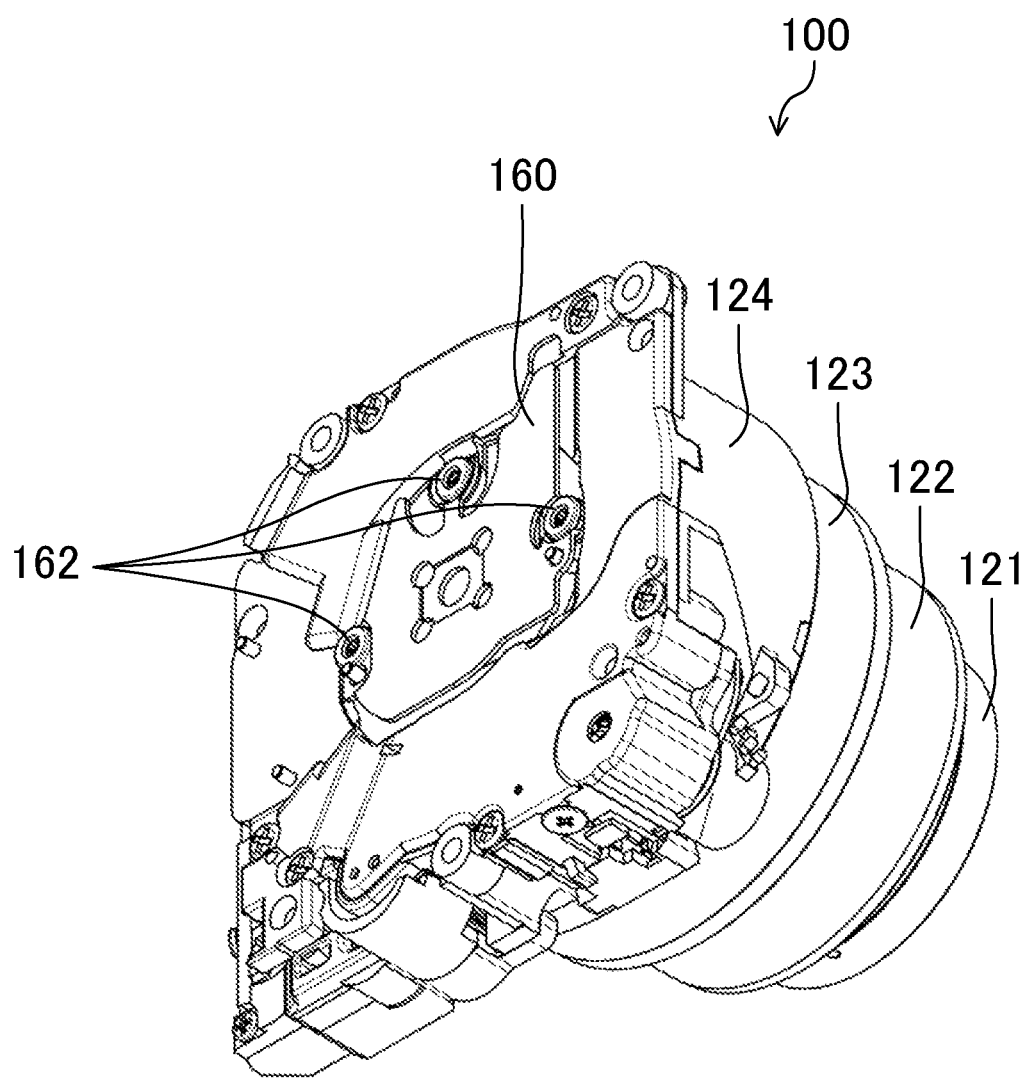
FIG. 2 is a perspective view of the lens barrel as viewed obliquely from the behind.
Figure 3:
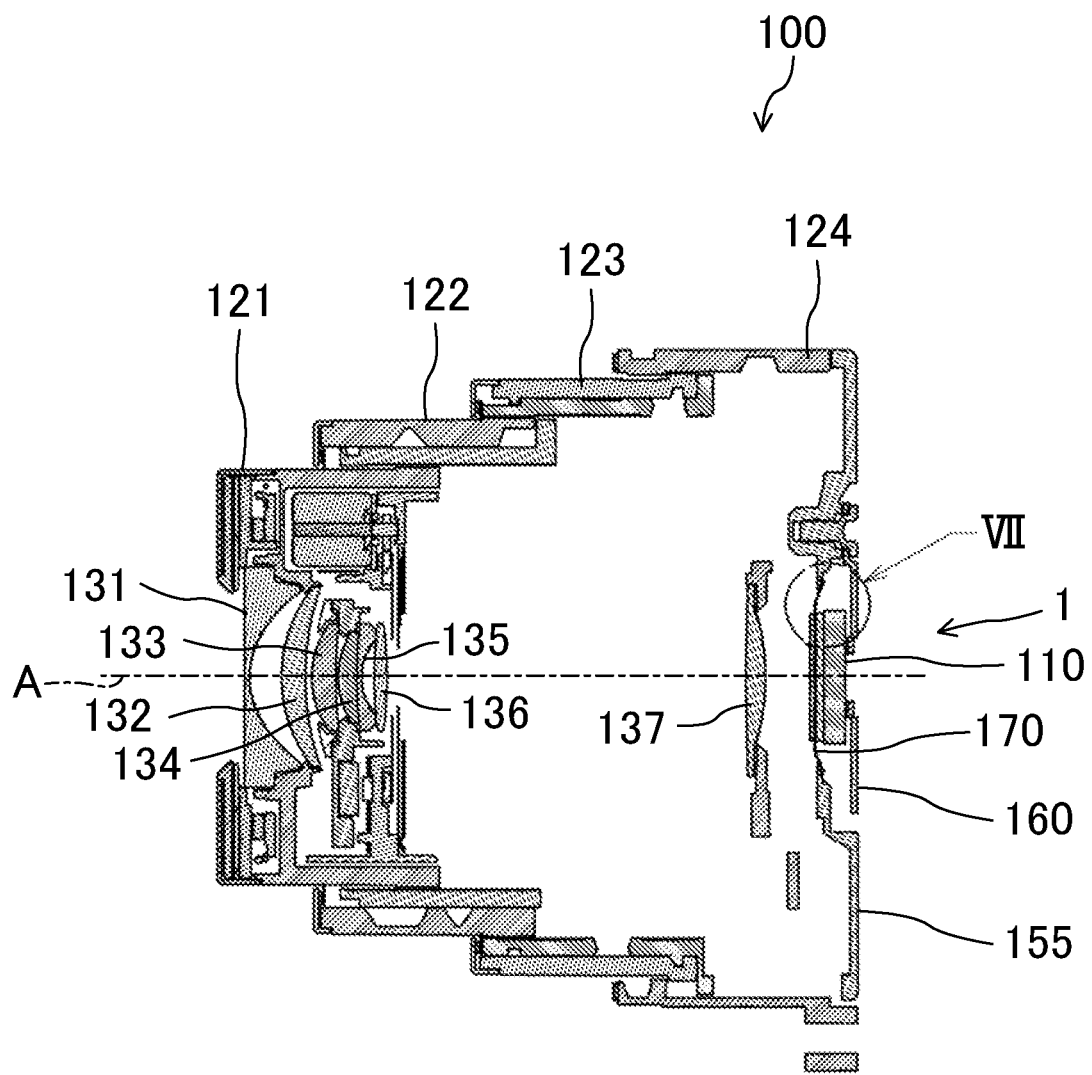
FIG. 3 is a longitudinal-sectional view of the lens barrel.

FIG. 1 is a perspective view of a lens barrel according to a first embodiment as viewed obliquely from the front, FIG. 2 is a perspective view of the lens barrel as viewed obliquely from the behind, and FIG. 3 is a cross-sectional view of the lens barrel.

[1. Configuration of Lens Barrel 100]

In this embodiment, a shielding structure in a lens barrel 100 will be described. The shielding structure is a part of an imaging device support structure 1.

The lens barrel 100 is used for an imaging apparatus such as a digital still camera and a video movie, etc. The lens barrel 100 includes an optical system having various lenses such as a zoom lens and a focus lens, etc. therein, and an imaging device 110 which converts incident light into an electrical signal to output the electrical signal. A light beam from an object is formed as an optical image in the imaging device 110 via the optical system. The imaging device 110 is comprised of a charge coupled device (CCD) sensor or a complementary metal-oxide semiconductor (CMOS) sensor.

The lens barrel 100 is of a collapsible type. Specifically, the lens barrel 100 includes a first lens barrel 121, a second lens barrel 122 which houses the first lens barrel 121, a third lens barrel 123 which houses the second lens barrel 122, and a fixed lens barrel 124 which houses the third lens barrel 123. The fixed lens barrel 124 is almost entirely housed in a camera body. When image shooting is performed, the first lens barrel 121 is brought out of the second lens barrel 122, the second lens barrel 122 is brought out of the third lens barrel 123, or the third lens barrel 123 is brought out of the fixed lens barrel 124. On the other hand, when image shooting is not performed, the first lens barrel 121 is stored in the second lens barrel 122, the second lens barrel 122 is stored in the third lens barrel 123, and the third lens barrel 123 is stored in the fixed lens barrel 124. Thus, when image shooting is not performed, the lens barrel 100 is stored in the camera body.

An optical system of the lens barrel 100 includes a lens group which takes in an optical image, and a zoom lens group, and a focus lens group. Each of the above-described lens groups is held by an associated one of lens frames and cam frames, and is configured to be movable in an optical axis A direction or a direction of an optical axis A. When image shooting is performed, distances between lens groups are adjusted, and the zoom and focus of an optical image are adjusted. A light beam from an object which has passed through the lens groups is formed as an optical image in the imaging device 110.

The zoom lens group is comprised of zoom lenses 131-136. The zoom lenses 131-136 are driven by a zoom motor unit in the optical axis A direction. The focus lens group is comprised of a focus lens 137. The focus lens 137 is driven by a focus motor unit in the optical axis A direction.

Figure 4:
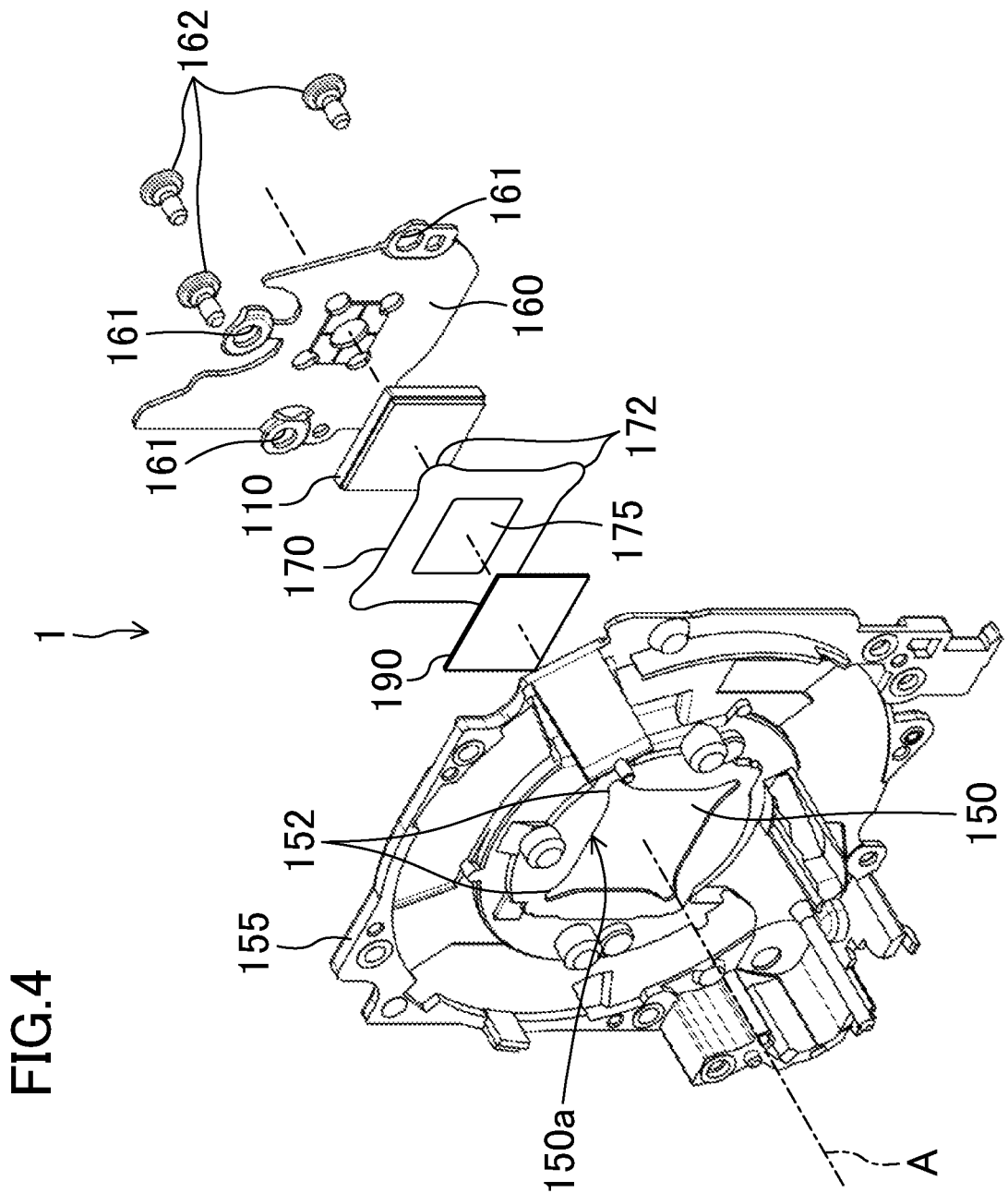
FIG. 4 is an exploded perspective view of a part of the lens barrel located on the periphery of the imaging device.
Figure 5:
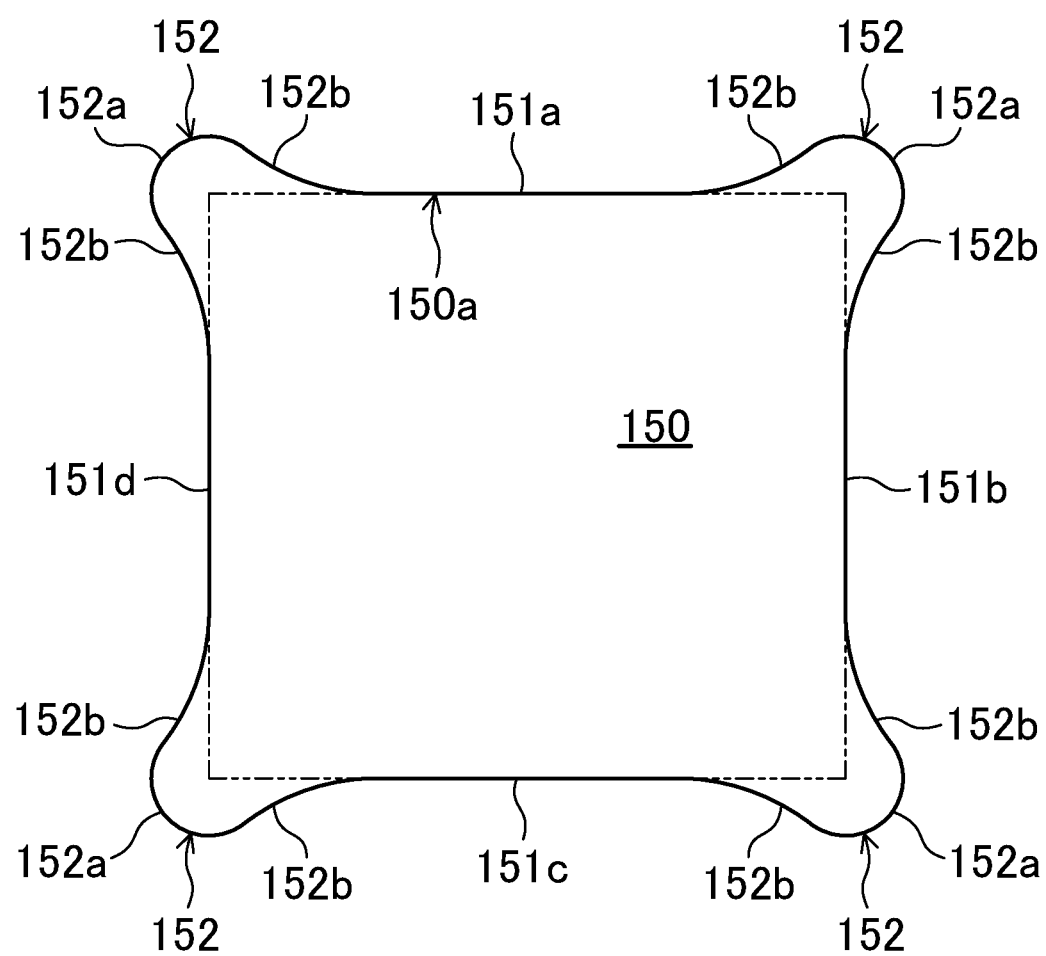
FIG. 5 is a front view of a first opening portion.
Figure 6:
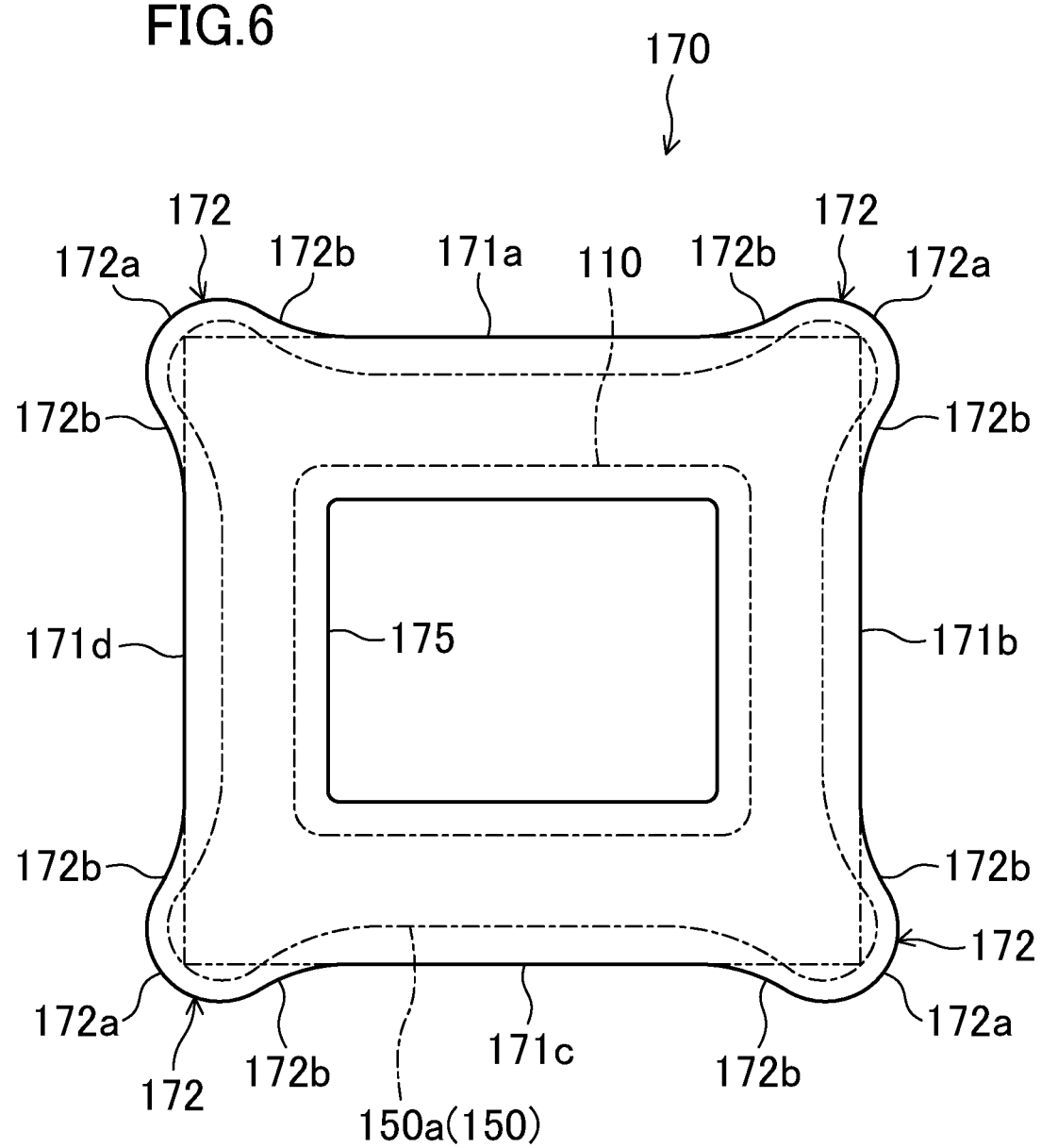
FIG. 6 is a front view of a dust-proof sheet.
Figure 7:
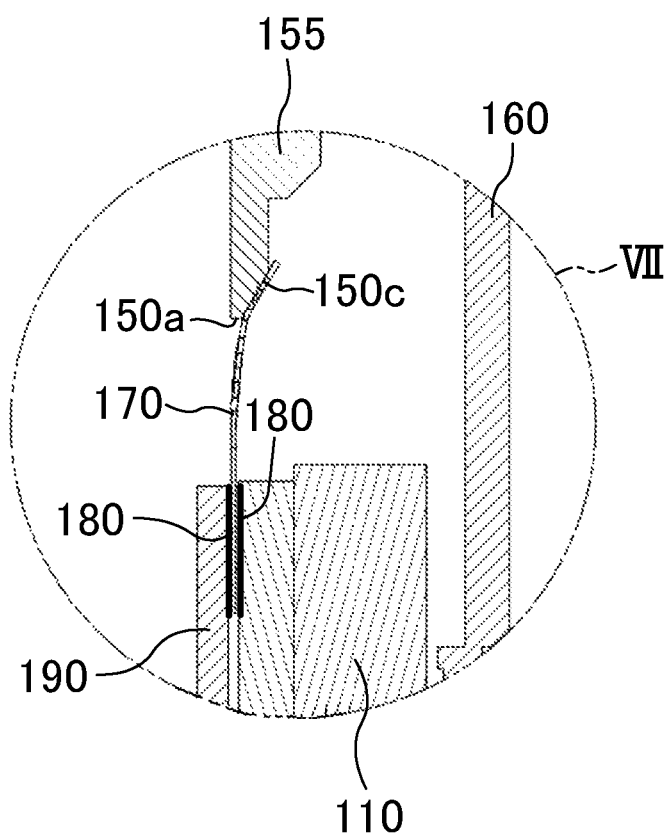
FIG. 7 is an enlarged cross-sectional view illustrating an enclosed part VII of the lens barrel of FIG. 3.

The lens barrel 100 includes an imaging device support structure 1. FIG. 4 is an exploded perspective view of a part of the lens barrel located on the periphery of the imaging device. FIG. 5 is a front view of a first opening portion. FIG. 6 is a front view of a dust-proof sheet. FIG. 7 is an enlarged cross-sectional view illustrating an enclosed part VII of the lens barrel of FIG. 3. As shown in FIGS. 3 and 4, the imaging device support structure 1 includes a master flange 155 having a first opening portion 150 through which an optical axis A passes, an attachment plate 160 which is attached to the master flange 155, an imaging device 110 supported by the attachment plate 160 and positioned inside the first opening portion 150 as viewed in the optical axis A direction, and a dust-proof sheet 170 which shields a gap between the master flange 155 and the imaging device 110 in the first opening portion 150. Note that, in the following description, for convenience sake, a front side is a side closer to an object in the optical axis A direction, and a rear side is an opposite side to the front side. A back face means a surface of any member facing the rear side.

The master flange 155 is a substantially plate-shaped member. The first opening portion 150 is formed substantially at the center of the master flange 155 to pass therethrough. The first opening portion 150 has a substantially rectangular shape. The shape of the first opening portion 150 will be described in more detail later. Three screw holes (not shown) for screwing the attachment plate 160 are provided in the back face of the master flange 155. The master flange 155 forms a first member.

The imaging device 110 is a substantially plate-shaped member. The imaging device 110 has a substantially rectangular shape which is smaller than the first opening portion 150. The imaging device 110 is attached indirectly to the master flange 155 with the attachment plate 160 interposed therebetween. The imaging device 110 forms a second member.

The dust-proof sheet 170 is made of an elastic, light-blocking plastic thin plate. The dust-proof sheet 170 is formed to have a substantially rectangular frame shape. The dust-proof sheet 170 has a substantially rectangular outer circumference and includes at the center thereof a second opening portion 175 having a substantially rectangular shape. The outer circumference of the dust-proof sheet 170 is larger than the first opening portion 150 of the master flange 155. The second opening portion 175 is smaller than the imaging device 110. The shape of the dust-proof sheet 170 will be described in more detail later. An opening edge portion of the second opening portion 175 of the dust-proof sheet 170 is adhered to a peripheral portion at the front face of the imaging device 110 via a double-sided adhesive tape 180. A filter glass 190 is adhered to the front face of the dust-proof sheet 170 via the double-sided adhesive tape 180 to cover the second opening portion 175. The dust-proof sheet 170 forms a shielding member.

The attachment plate 160 is a substantially plate-shaped member. Three through holes 161, 161 . . . through which screws 162, 162 . . . are inserted are provided in the attachment plate 160. The imaging device 110 is adhered to the attachment plate 160. The attachment plate 160 forms an attachment member.

When the attachment plate 160 is attached to the master flange 155 via the screws 162, 162 . . . , the imaging device 110 is positioned inside the first opening portion 150 of the master flange 155 as viewed in the optical axis A direction. The dust-proof sheet 170 contacts an opening edge 150a of the first opening portion 150 from the back side of the master flange 155. In this case, the dust-proof sheet 170 contacts the entire circumference of the opening edge 150a of the first opening portion 150. Since the imaging device 110 is smaller than the first opening portion 150, a gap is formed between the master flange 155 and the imaging device 110 in the first opening portion 150. However, the gap is shielded by the dust-proof sheet 170. Thus, the entrance of foreign substances such as dust and dirt into the lens barrel 100 through the gap can be prevented or reduced.

In this case, a tilt of the imaging device 110 relative to the optical axis A can be adjusted by adjusting a tightening amount of each of the three screws 162, 162 . . . . That is, the screw holes of the master flange 155, the through holes 161, 161 . . . in the attachment plate 160, and the screws 162, 162 . . . form a tilt adjustment mechanism.

[2. Configuration of First Opening Portion 150]

The shape of the first opening portion 150 will be described in more detail below. The opening edge 150a of the first opening portion 150 has a substantially rectangular shape with corner portions which outwardly protrude. Specifically, the opening edge 150a of the first opening portion 150 has a pair of substantially straight long side portions 151a and 151c which correspond to long sides of a rectangular shape and extend in parallel to each other, a pair of substantially straight short side portions 151b and 151d which correspond to short sides of the rectangular shape and extend in parallel to each other, and four corner portions 152, 152 . . . which correspond to corners of the rectangular shape. The term "substantially straight" as used herein does not strictly mean straight, but includes substantially straight shapes. That is, herein, the term "substantially straight" can mean an elongated shape, which may be a slightly curved shape. Each of the corner portions 152 outwardly protrudes as compared to a rectangular shape (indicated by a two-dot chain line in FIG. 5) formed by extensions of the long side portions 151a and 151c and the short side portions 151b and 151d. The overall shape of each of the corner portions 152 is a bell shape. At least an apex portion 152a of each corner portion 152 which most outwardly protrudes, and foot portions 152b, 152b of the corner portion 152 at which the long side portion 151a (151c) and the short side portion 151b (151d) are respectively connected together are formed by curves. The term a "portion which most outwardly protrudes" used herein means a portion of each corner portion 152 located most distant from the center (the center of gravity) of the first opening portion 150. The apex portion 152a is curved to raised toward the outside of the first opening portion 150. Each of the foot portions 152b is curved to be recessed toward the inside of the first opening portion 150. In the above-described manner, each of the corner portions 152 is formed so as to be smoothly connected to the long side portion 151a (151c) and the short side portion 151b (151d), and the corner portion 152 itself is formed with a smooth curve.

[3. Configuration of Dust-Proof Sheet 170]

A configuration of the dust-proof sheet 170 will be described in detail. The dust-proof sheet 170 has a substantially rectangular outer circumference with corner portions which outwardly protrude. Specifically, the dust-proof sheet 170 has a pair of substantially straight long side portions 171a and 171c which correspond to long sides of a rectangular shape and extend in parallel to each other, a pair of substantially straight short side portions 171b and 171d which correspond to short sides of the rectangular shape and extend in parallel to each other, and four corner portions 172, 172 . . . which correspond to corners of the rectangular shape. Each of the corner portions 172 outwardly protrudes as compared to a rectangular shape (indicated by a two-dot chain line in FIG. 6) formed by extensions of the long side portions 171a and 171c and the short side portions 171b and 171d. The overall shape of each of the corner portions 172 is a bell shape. At least an apex portion 172a of each corner portion 172 which most outwardly protrudes, and foot portions 172b, 172b of the corner portion 172 at which the long side portion 171a (171c) and the short side portion 171b (171d) are respectively connected together are formed by curves. The apex portion 172a is curved to be raised toward the outside of the dust-proof sheet 170. Each of the foot portions 172b is curved to be recessed toward the inside the dust-proof sheet 170. In the above-described manner, each of the corner portions 172 is formed so as to be smoothly connected to the long side portion 171a (171c) and the short side portion 171b (171d), and the corner portion 172 itself is formed by a smooth curve.

[4. Placing of Dust-Proof Sheet 170]

When being placed onto the master flange 155, the dust-proof sheet 170 formed in the above-described manner is pressed against the opening edge 150a of the first opening portion 150 of the master flange 155 by pressing force of the attachment plate 160 which is applied through the imaging device 110. In this case, as shown in FIG. 7, in the back face of the master flange 155, the opening edge 150a of the first opening portion 150 is chamfered, and the opening edge 150a is a plane tilted relative to the optical axis A. That is, in the back face of the master flange 155, the opening edge 150a of the first opening portion 150 is a tilted surface 150c having a certain width. Therefore, the dust-proof sheet 170 contacts the tilted surface 150c as the opening edge 150a of the first opening portion 150.

In this case, the central portion of the dust-proof sheet 170 is pressed forward by the imaging device 110, and the movement of the peripheral portion of the dust-proof sheet 170 is restricted by the opening edge 150a of the first opening portion 150. Thus, the dust-proof sheet 170 is deformed so that the central portion protrudes forward as compared to the peripheral portion. At that time, wrinkles due to twists and warps are formed in the dust-proof sheet 170. The wrinkles are hardly formed near a center (a center of gravity) of the first opening portion 150, for example, at the center of each of the long side portions 151a and 151c and the short side portions 151b and 151d, and readily concentrate at the corner portions 152, 152 . . . which are distant from the center (the center of gravity) of the first opening portion 150. In this embodiment, the corner portions 152, 152 . . . outwardly protrude, and thus, a space in each of the corner portions 152, 152 . . . is expanded as compared to a configuration in which the opening edge 150a of the first opening portion 150 has a simple, substantially rectangular shape. Therefore, if the opening edge 150a of the first opening portion 150 has a simple, substantially rectangular shape, the dust-proof sheet 170, in which wrinkles are conventionally formed at the corner portions of the rectangular shape, spreads out in the corner portions 152, so that formation of wrinkles can be reduced. As a result, a close contact between the dust-proof sheet 170 and the master flange 155 is provided, and thus, entrance of a foreign substance such as dust and dirt into the lens barrel 100 through the gap between the dust-proof sheet 170 and the master flange 155 can be prevented or reduced.

[5. Advantages of First Embodiment]

In this embodiment, the imaging device support structure 1 includes the master flange 155 having the first opening portion 150 through which an optical axis A passes, the imaging device 110 which is indirectly attached to the master flange 155 and is positioned inside the first opening portion 150 as viewed in the optical axis A direction, and the dust-proof sheet 170 which shields a gap between the master flange 155 and the imaging device 110 in the first opening portion 150.

The dust-proof sheet 170 is pressed against the opening edge 150a of the first opening portion 150, the opening edge 150a of the first opening portion 150 has a substantially rectangular shape, and the corner portions 152, 152 . . . outwardly protrude. As described above, the corner portions 152, 152 . . . of the first opening portion 150 are formed to outwardly protrude, so that a space in which the dust-proof sheet 170 spreads out can be ensured, and wrinkles in the dust-proof sheet 170 can be reduced.

That is, in the configuration in which the dust-proof sheet 170 is pressed against the master flange 155 and the dust-proof sheet 170 is deformed so that the central portion thereof protrudes forward as compared to the peripheral portion thereof, twists and warps are formed in the dust-proof sheet 170. As a result, wrinkles are formed in the dust-proof sheet 170. Specifically, in this embodiment, since the outer circumference edge is a free end, in such a configuration, wrinkles are readily formed in a contact portion of the dust-proof sheet 170 and the opening edge 150a of the first opening portion 150, and a gap might be formed in the contact portion of the dust-proof sheet 170 and the opening edge 150a of the first opening portion 150.

However, the corner portions 152, 152 . . . of the first opening portion 150 in which wrinkles of the dust-proof sheet 170 readily concentrate are formed to outwardly protrude, so that the dust-proof sheet 170 can be caused to spread in the corner portions 152, and wrinkles in the dust-proof sheet 170 can be reduced. As a result, entrance of a foreign substance such as dust and dirt into the lens barrel 100 through the gap between the dust-proof sheet 170 and the master flange 155 can be prevented or reduced.

The foot portions 152b, 152b of the corner portion 152, at which the long side portion 151a (151c) and the short side portions 151b (151d) are respectively connected together are formed by curves. Thus, a close contact between the dust-proof sheet 170 and the opening edge 150a is provided.

That is, if each of connection portions of the corner portions 152 and the long side portion 151a (151c) and the short side portion 151b (151d) is angulated, the dust-proof sheet 170 has to be bent at the connection portions in order to ensure a close contact between the dust-proof sheet 170 and the opening edge 150a. However, in a simple configuration in which the flat dust-proof sheet 170 is merely pressed against the opening edge 150a, it is difficult to naturally bend the dust-proof sheet 170, and furthermore, since parts of the dust-proof sheet 170 corresponding to the connection portions vary depending on the press amount, it is difficult to bend the dust-proof sheet 170 beforehand.

In contrast, the foot portions 152b, 152b of each corner portion 152 are formed by curves, and are smoothly connected to the long side portion 151a (151c) and the short side portion 151b (151d), respectively. That is, the dust-proof sheet 170 can be naturally curved along the opening edge 150a by pressing the dust-proof sheet 170 against the opening edge 150a. As a result, a close contact between the dust-proof sheet 170 and the opening edge 150a is provided.

Furthermore, the apex portion 152a of each corner portion 152 is formed by a curve, and thus, a further intimate contact of the dust-proof sheet 170 and the opening edge 150a can be provided. That is, at the apex portions 152a of the corner portions 152, the dust-proof sheet 170 is most greatly curved. If the apex portion 152a of each corner portion 152 is angulated, a close contact between the dust-proof sheet 170 and the opening edge 150a cannot be ensured unless the dust-proof sheet 170 is bent. In contrast, when the dust-proof sheet 170 is gradually curved by forming the apex portions 152a of the corner portions 152 by curves, a close contact between the dust-proof sheet 170 and the opening edge 150a can be ensured.

Furthermore, a close contact between the dust-proof sheet 170 and the opening edge 150a can be provided by forming the dust-proof sheet 170 to have the same shape as the shape of the opening edge 150a. When the dust-proof sheet 170 is deformed so that the center portion of the dust-proof sheet 170 protrudes forward, wrinkles are larger in the peripheral portion of the dust-proof sheet 170. Parts of the dust-proof sheet 170 which are formed into wrinkles are unnecessary parts for deformation of the dust-proof sheet 170, and interfere with deformation of the dust-proof sheet 170 in some degree. Therefore, in this embodiment, similar to the opening edge 150a of the first opening portion 150, the dust-proof sheet 170 is formed to have a substantially rectangular shape with four corners which outwardly protrude. That is, parts of the peripheral portion of the dust-proof sheet 170 corresponding to the corner portions 152, 152 . . . of the opening edge 150a of the first opening portion 150 outwardly protrude to be held in contact with the corner portions 152, 152 . . . , but other parts are cut in to the extent that the parts of the dust-proof sheet 170 can be held in contact with the long side portions 151a and 151c and the short side portions 151b and 151d of the opening edge 150a. Thus, since unnecessary parts of the dust-proof sheet 170 are cut out, formation of wrinkles in the circumference portion when the dust-proof sheet 170 is deformed is prevented or reduced, and the dust-proof sheet 170 can be readily deformed. In addition, the dust-proof sheet 170 is formed to have a smaller area as compared to a configuration in which the dust-proof sheet 170 is formed to have a large, substantially rectangular shape surrounding portions corresponding to the corner portions 152, 152 . . . of the opening edge 150a, so that the material cost can be reduced. Furthermore, areas from which the parts of the peripheral portion of the dust-proof sheet 170 is cut out can be effectively utilized, for example, by providing some other member in the areas.

The imaging device support structure 1 further includes a tilt adjustment mechanism capable of adjusting a tilt of the imaging device 110 relative to the master flange 155. The adjustment mechanism can adjust the tilt of the imaging device 110 relative to the master flange 155 by adjusting the press amount of the imaging device 110 against the master flange 155. In such a configuration, when the press amount of the imaging device 110 against the master flange 155 is adjusted, the press amount of the dust-proof sheet 170 against the master flange 155 varies. Therefore, the opening edge 150a of the first opening portion 150 has a shape with the corner portions 152, 152 . . . which outwardly protrude, and thus, even when the press amount of the dust-proof sheet 170 varies, formation of wrinkles in the dust-proof sheet 170 can be reduced.

<<Second Embodiment>>

Figure 8:
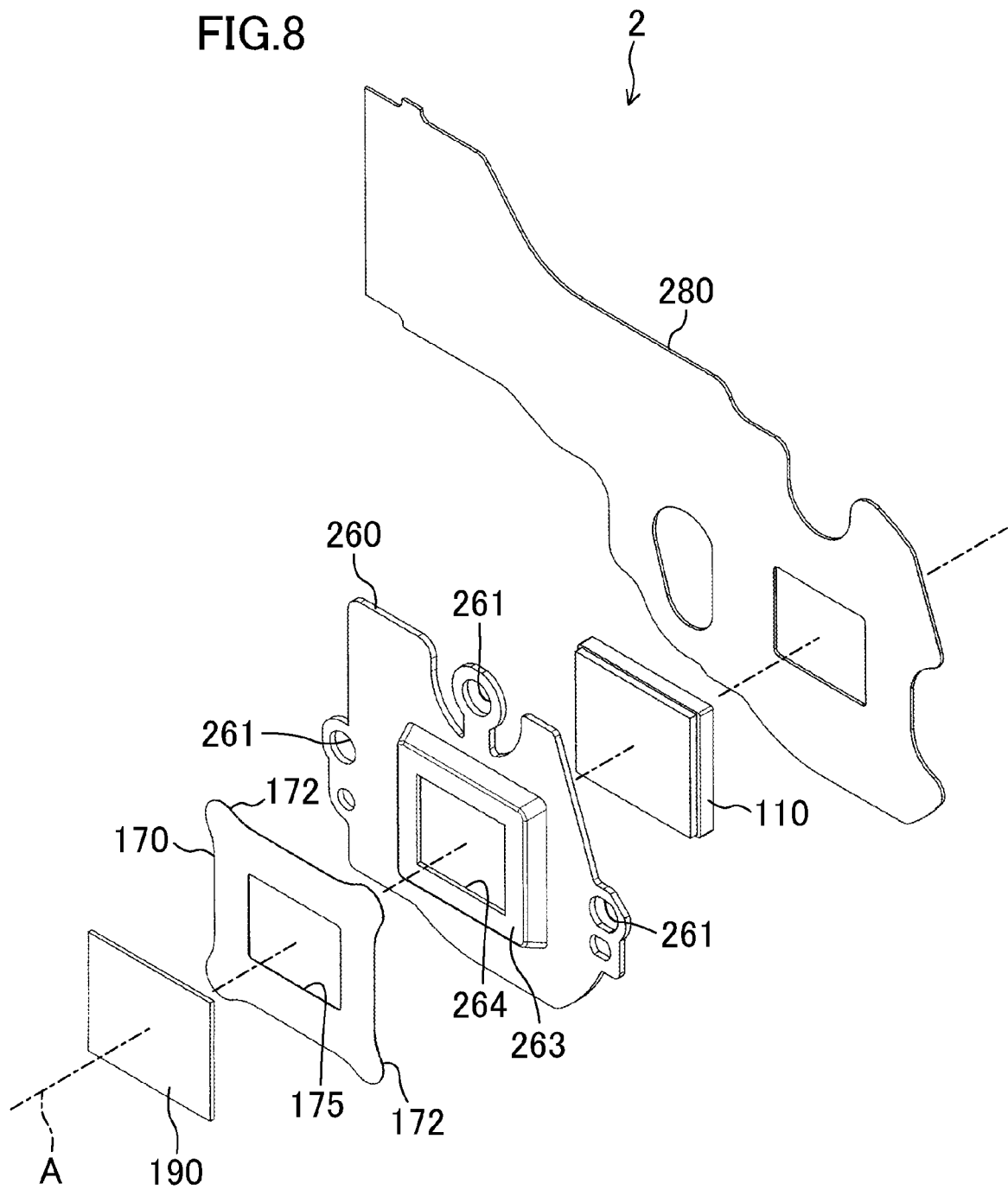
FIG. 8 is an exploded perspective view of an imaging device support structure according to a second embodiment.
Figure 9:
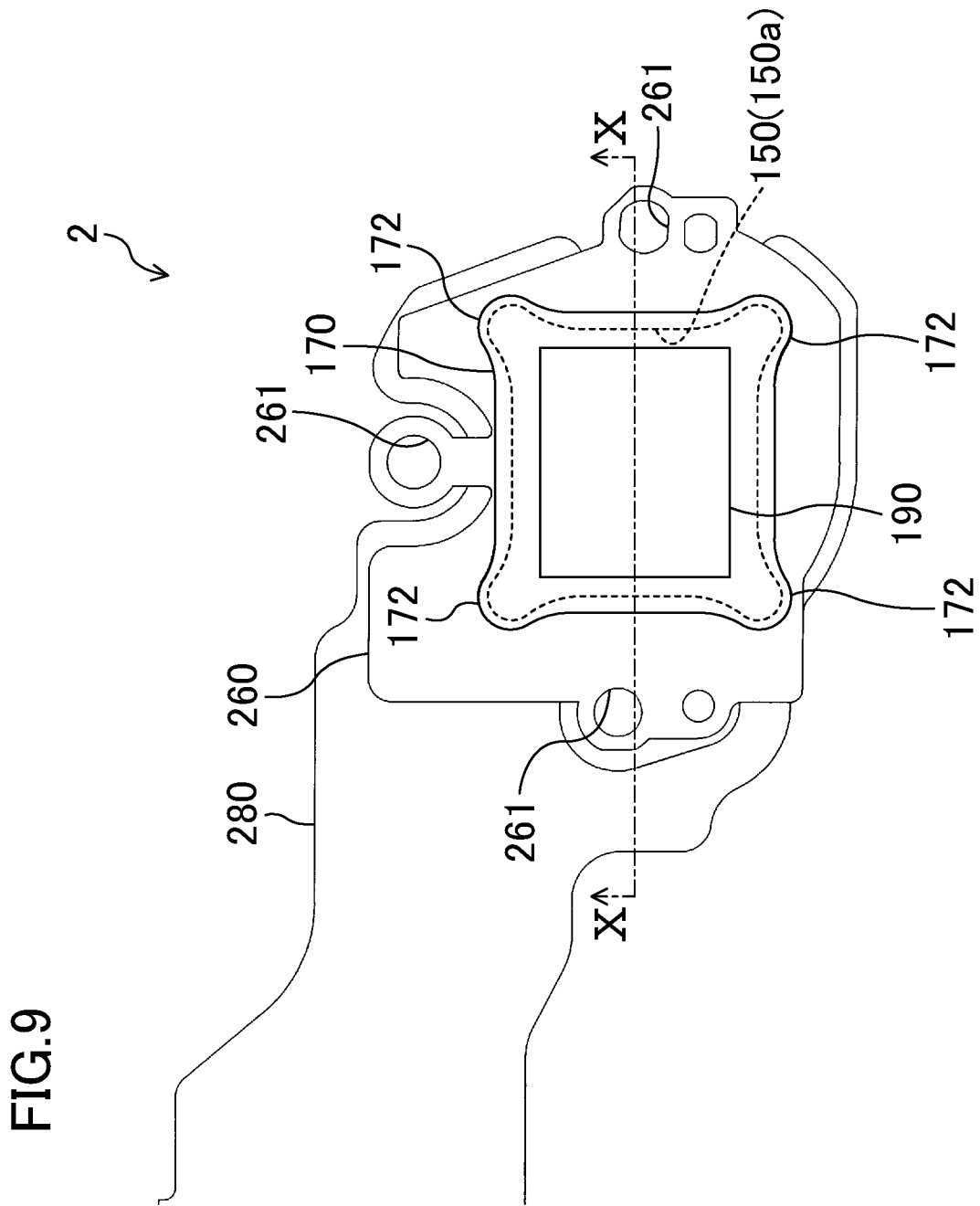
FIG. 9 is a front view of an imaging device structure.
Figure 10:
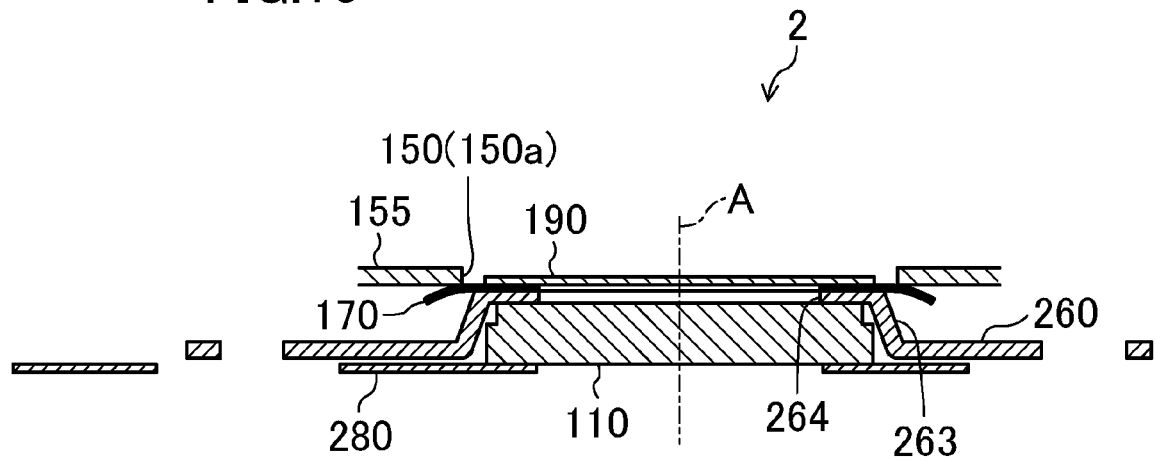
FIG. 10 is a cross-sectional view of the imaging device structure taken along the line X-X of FIG. 9.

Subsequently, a second embodiment will be described. FIG. 8 is an exploded perspective view of an imaging device support structure according to the second embodiment, FIG. 9 is a front view of the imaging device support structure, and FIG. 10 is a cross-sectional view taken along the lint X-X.

In an imaging device support structure 2 according to the second embodiment, an imaging device 110 and a dust-proof sheet 170, etc. are arranged in a different manner from that in the first embodiment. Therefore, each member also shown in the first embodiment is identified by the same reference character, the description thereof will be omitted, and the configuration of each of different parts will be mainly described.

The imaging device support structure 2 includes a master flange 155 (shown only in FIG. 9), an attachment plate 260 attached to the master flange 155, an imaging device 110 supported by the attachment plate 260 and positioned in a first opening portion 150 as viewed in an optical axis A direction, and a dust-proof sheet 170 which shields a gap between the master flange 155 and the attachment plate 260 in the first opening portion 150.

The attachment plate 260 is a substantially plate-shaped member. Three through holes 261, 261 . . . through which screws (not shown) are inserted are provided in the attachment plate 260. A raised portion 263 which is raised forward is provided at the center of the attachment plate 260. The raised portion 263 has a substantially rectangular shape which is larger than the imaging device 110 and smaller than the first opening portion 150 of the master flange 155. An opening portion 264 is formed at the center of the raised portion 263 to pass therethrough. The imaging device 110 is fitted in the raised portion 263 from the back side, and an imaging plane of the imaging device 110 is exposed through the opening portion 264 to face forward. A peripheral portion of the front face of the imaging device 110 is adhered to the raised portion 263 of the attachment plate 260 from the back side. The attachment plate 260 forms an attachment member.

The dust-proof sheet 170 is adhered to the front face of the raised portion 263 of the attachment plate 260. A second opening portion 175 in the dust-proof sheet 170 is smaller than the raised portion 263 and larger than the opening portion 264. A filter glass 190 is adhered to the front face of the dust-proof sheet 170 via a double-sided adhesive tape to cover the second opening portion 175.

A flexible substrate 280 is attached to the back face of the imaging device 110, and is electrically coupled to the imaging device 110.

The attachment plate 260 configured in the above-described manner is attached to the master flange 155 via screws. Thus, the imaging device 110 is indirectly attached to the master flange 155 with the attachment plate 260 interposed therebetween. In this state, the imaging device 110 and the raised portion 263 are positioned in the first opening portion 150 of the master flange 155 as viewed in the optical axis A direction. The dust-proof sheet 170 contacts an opening edge 150a of the first opening portion 150 from the back side of the master flange 155. In this case, the dust-proof sheet 170 contacts the entire opening edge 150a of the first opening portion 150. Since the raised portion 263 is smaller than the first opening portion 150, a gap is formed between the master flange 155 and the raised portion 263 in the first opening portion 150. However, the gap is shielded by the dust-proof sheet 170. Thus, entrance of a foreign substance such as dust and dirt into the lens barrel 100 through the gap can be prevented or reduced.

That is, in contrast to the first embodiment in which the dust-proof sheet 170 shields the gap between the master flange 155 and the imaging device 110, the dust-proof sheet 170 shields the gap between the master flange 155 and the attachment plate 260 in the second embodiment. Even in the above-described configuration, the dust-proof sheet 170 is deformed, by attaching the attachment plate 260 to the master flange 155, so that the central portion the dust-proof sheet 170 to which the raised portion 263 is attached protrudes forward as compared to the peripheral portion the dust-proof sheet 170. In this case, twists and warps are formed in the dust-proof sheet 170, but a space in which the dust-proof sheet 170 spreads out with no wrinkle formed is ensured by providing corner portions 152, 152 . . . of the opening edge 150a of the first opening portion 150, so that wrinkles of the dust-proof sheet 170 can be reduced. Thus, the gap between the dust-proof sheet 170 and the master flange 155 can be reduced, and peeling of the dust-proof sheet 170 from the raised portion 263 or the filter glass 190 can be prevented or reduced.

Therefore, according to this embodiment, the imaging device support structure 2 includes the master flange 155 having the first opening portion 150 through which the optical axis A passes, the attachment plate 260 attached to the master flange 155, the imaging device 110 which is attached to the attachment plate 260 and is positioned in the first opening portion 150 as viewed in the optical axis A direction, and the dust-proof sheet 170 which shields a gap between the master flange 155 and the attachment plate 260 in the first opening portion 150. The dust-proof sheet 170 is pressed against the opening edge 150a of the first opening portion 150, the opening edge 150a of the first opening portion 150 has a substantially rectangular shape, and the corner portions 152, 152 . . . outwardly protrude. Thus, since the corner portions 152, 152 . . . of the first opening portion 150 are formed to outwardly protrude, a space in which the dust-proof sheet 170 spreads out can be ensured, and wrinkles in the dust-proof sheet 170 can be reduced.

<<Third Embodiment>>

Figure 11:
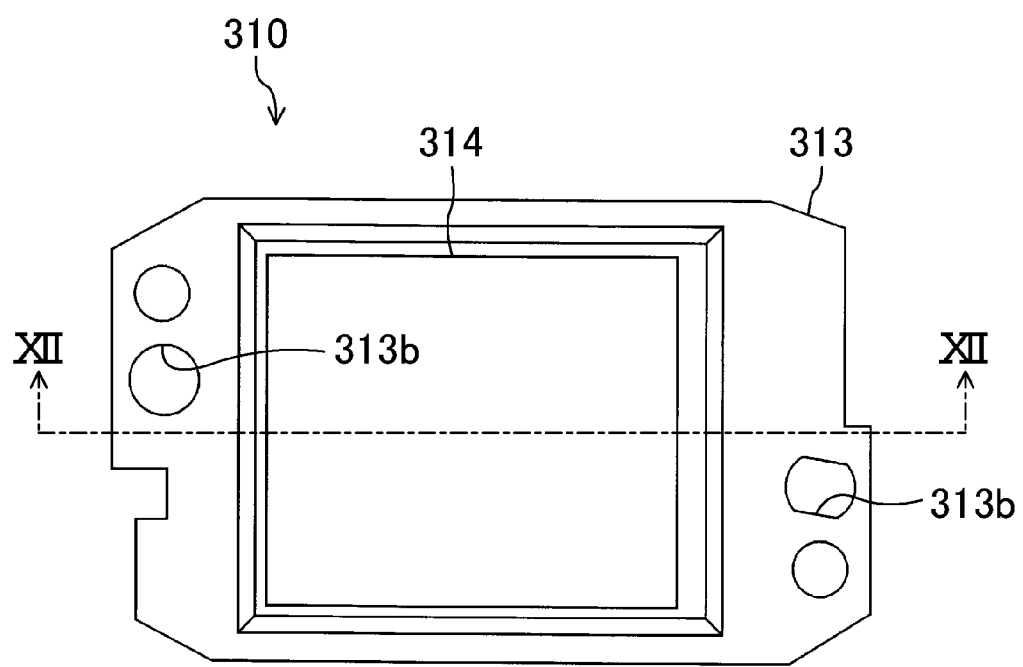
FIG. 11 is a front view of an imaging device according to a third embodiment.
Figure 12:
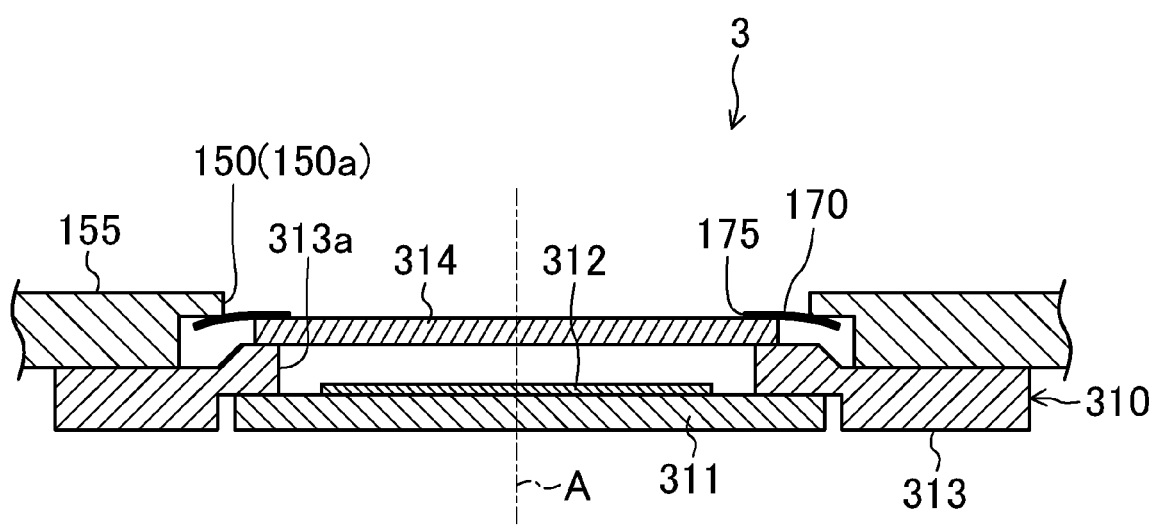
FIG. 12 is a cross-sectional view of the imaging device support structure taken along the line XII-XII of FIG. 11.

Subsequently, a third embodiment will be described. FIG. 11 is a front view of an imaging device according to the third embodiment, and FIG. 12 is a cross-sectional view of an imaging device support structure taken along the line XII-XII of FIG. 11.

An imaging device support structure 3 according to the third embodiment is different from the imaging device support structure 1 of the first embodiment in that an imaging device is directly attached to a master flange. Therefore, each member also shown in the first embodiment is identified by the same reference character, the description thereof will be omitted, and the configuration of each of different parts will be mainly described.

An imaging device 310 according to the third embodiment includes a ceramic substrate 311, a semiconductor device 312 provided on one principal surface of the ceramic substrate 311, a plate-shaped resin package 313 having an opening portion 313a at the center thereof, and a cover glass 314 which covers the opening portion 313a of the resin package 313.

The ceramic substrate 311 is a substantially plate-shaped member having a substantially rectangular shape. The semiconductor device 312 has a substantially rectangular shape, and has the photoelectric conversion function.

The opening portion 313a of the resin package 313 has a substantially rectangular shape which is smaller than the ceramic substrate 311 and larger than the semiconductor device 312. The ceramic substrate 311 is attached to the resin package 313 from the back side. In this case, the semiconductor device 312 is positioned in the opening portion 313a. The cover glass 314 is attached to the front face of the resin package 313 to cover the opening portion 313a. Through holes 313b, 313b through which screws are inserted are formed in the resin package 313 to pass therethrough. The imaging device 310 is attached to the master flange 155 (shown only in FIG. 12) via the screws inserted through the 313b, 313b. The resin package 313 forms an attachment portion.

In this case, the dust-proof sheet 170 (shown only in FIG. 12) is adhered to the front face of the cover glass 314. The configuration of the dust-proof sheet 170 is similar to that of the first embodiment. The second opening portion 175 of the dust-proof sheet 170 is smaller than the cover glass 314. The dust-proof sheet 170 is adhered to the front face of the cover glass 314 so that a large part of the cover glass 314 is exposed through the second opening portion 175.

With the imaging device 310 attached to the master flange 155, the cover glass 314 is positioned in the first opening portion 150 of the master flange 155 as viewed in the optical axis A direction. The dust-proof sheet 170 is pressed against the opening edge 150a of the first opening portion 150 of the master flange 155, and is deformed so that the central portion of the dust-proof sheet 170 to which the imaging device 310 is adhered protrudes forward as compared to the peripheral portion thereof. In this case, twists and warps are formed in the dust-proof sheet 170, but a space in which the dust-proof sheet 170 spreads out with no wrinkle formed is ensured by providing corner portions 152, 152 . . . of the opening edge 150a of the first opening portion 150, so that wrinkles of the dust-proof sheet 170 can be reduced. Thus, the gap between the dust-proof sheet 170 and the master flange 155 can be prevented or reduced, and peeling of the dust-proof sheet 170 from the raised portion 263 or the filter glass 190 can be prevented or reduced.

<<Fourth Embodiment>>

Figure 13:
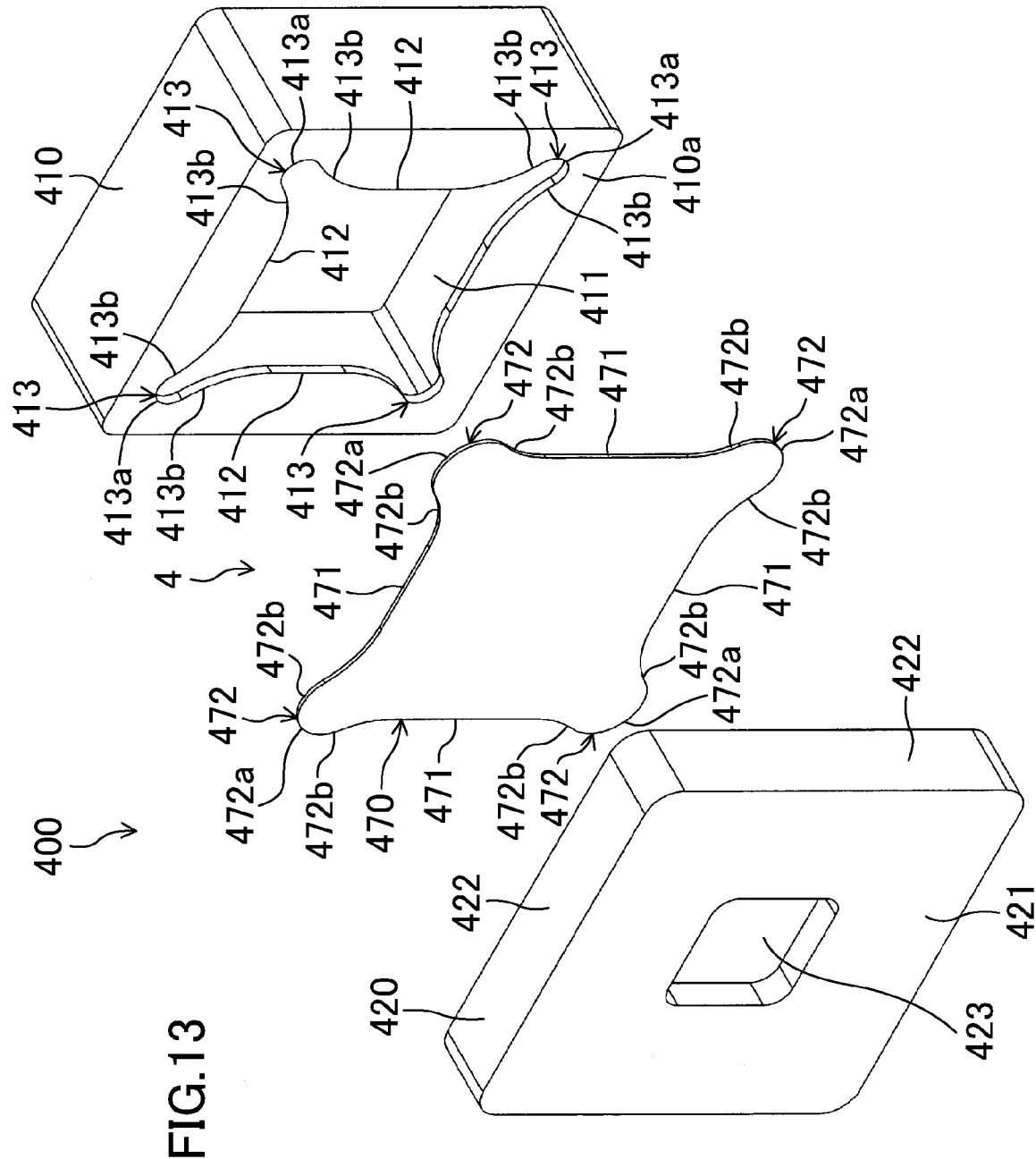
FIG. 13 is an exploded perspective view of a container according to a fourth embodiment.
Figure 14:
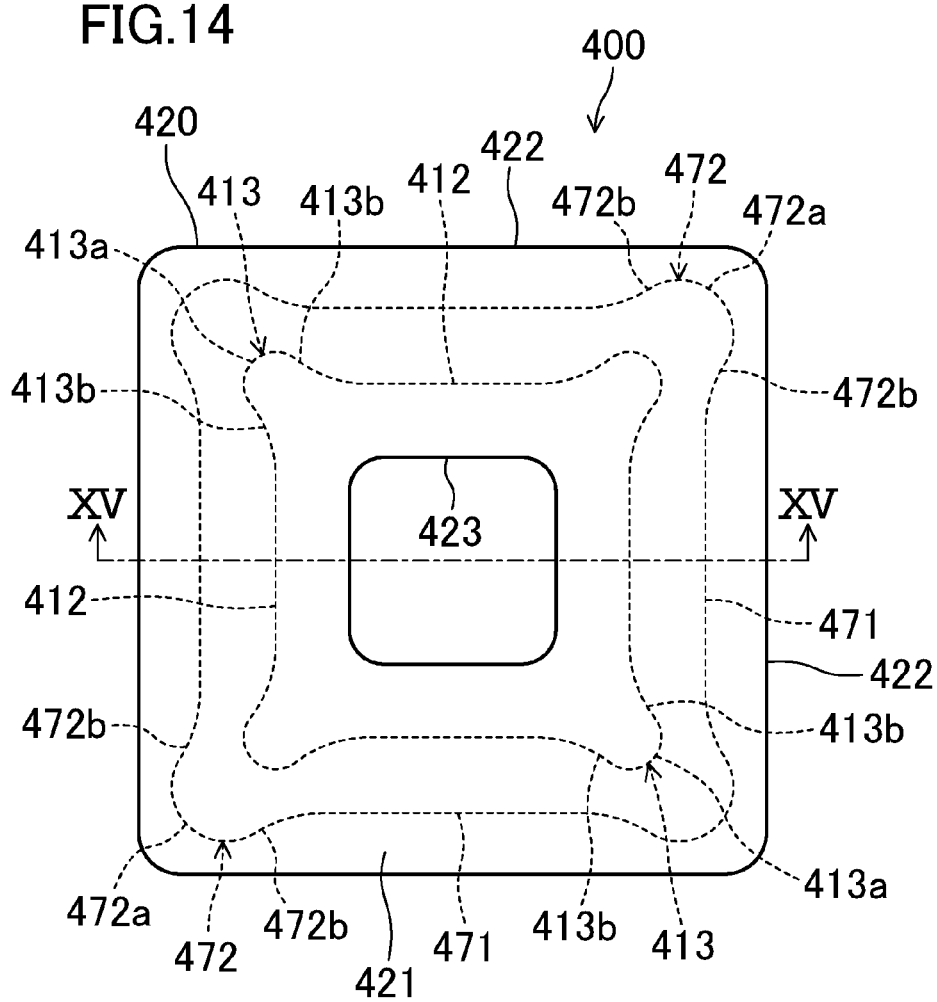
FIG. 14 is a front view of the container.
Figure 15:
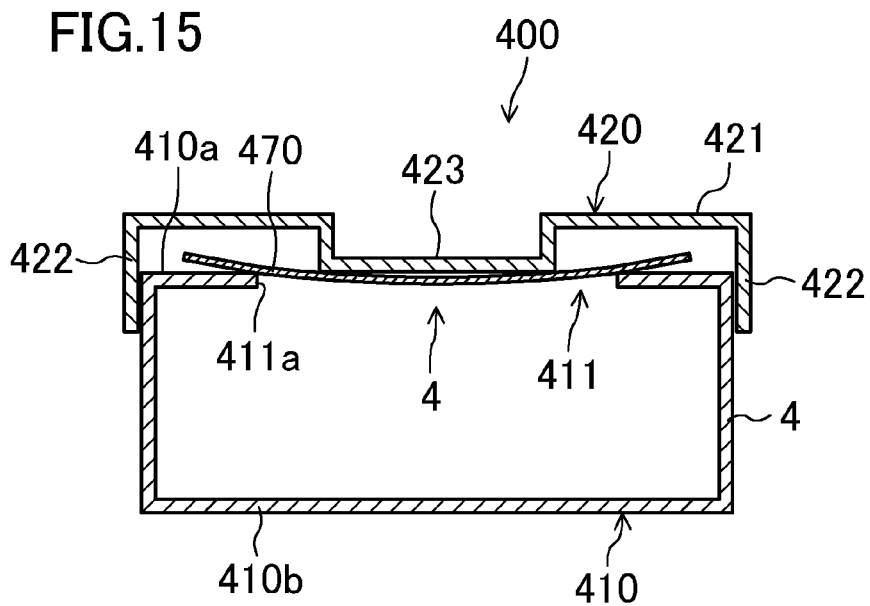
FIG. 15 is a cross-sectional view of the container taken along the line XV-XV of FIG. 14.

Subsequently, a fourth embodiment will be described. FIG. 13 is an exploded perspective view of a container according to the fourth embodiment, FIG. 14 is a front view of the container of the fourth embodiment, and FIG. 15 is a cross-sectional view of the container taken along the line XV-XV.

A container 400 according to the fourth embodiment is, for example, a container for storing food, etc. The container 400 includes a case 410 and a lid 420. The container 400 includes a shielding structure 4.

The case 410 is a substantially hollow rectangular parallelepiped member. Each of a pair of wall portions 410a and 410b of the parallelepiped member facing each other is formed to have a substantially square shape. A substantially square opening portion 411 is formed in the center of one of the pair of the wall portions, i.e., the wall portion 410a to pass therethrough. The case 410 forms a first member.

The lid 420 includes a principal wall portion 421 having a substantially square shape which is larger than the wall portion 410a of the case 410, and four peripheral walls 422, 422 . . . each of which extends perpendicularly from a circumference edge of the principal wall portion 421. A recess portion 423 is formed at the center of the principal wall portion 421 to be inwardly recessed. That is, the recess portion 423 is recessed in the same direction as the direction in which the peripheral walls 422 extend from the principal wall portion 421. A cross section of the recess portion 423 has a substantially square shape which is smaller than the opening portion 411. In a state where the lid 420 is placed on the case 410, the recess portion 423 is positioned inside the opening portion 411. The lid 420 forms a second member.

A dust-proof sheet 470 is provided between the case 410 and the lid 420. The dust-proof sheet 470 is made of an elastic, light-blocking plastic thin plate. The dust-proof sheet 470 is formed to have a substantially square shape which is smaller than the wall portion 410a of the case 410 and larger than the opening portion 411. The dust-proof sheet 470 is placed on the case 410 to cover the opening portion 411. The dust-proof sheet 470 forms a shielding member.

Specifically, an opening edge 411a of the opening portion 411 has a substantially square shape with corner portions which outwardly protrude. More specifically, the opening edge 411a of the opening portion 411 has four side portions 412, 412 . . . which correspond to sides of a square shape, and four corner portions 413, 414 . . . which correspond to corners of the square shape. Each of the corner portions 413 outwardly protrudes as compared to a square shape (indicated by a two-dot chain line in the drawings) formed by extensions of the side portions 412, 412 . . . . The overall shape of each of the corner portions 413 is a bell shape. At least an apex portion 413a of each corner portion 413 which most outwardly protrudes, and foot portions 413b, 413b of the corner portion 413 at which the side portions 412, 412 are connected together are formed by curves. Each of the apex portions 413a is curved to be raised toward the outside of the dust-proof sheet 470. Each of the foot portions 413b is curved to be recessed toward the inside of the dust-proof sheet 470. In the above-described manner, each of the corner portions 413 is formed so that the side portions 412, 412 are smoothly connected, and the corner portion 413 itself is formed by a smooth curve.

The dust-proof sheet 470 has a substantially square outer circumference with corner portions which outwardly protrude. Specifically, the dust-proof sheet 470 has substantially straight side portions 471, 471 . . . which correspond to sides of a square shape, and four corner portions 472, 472 . . . which correspond to corners of the square shape. The term "substantially straight" as used herein does not strictly mean straight, but includes substantially straight shapes. That is, herein, the term "substantially straight" can mean having an elongated shape, which may be a slightly curved shape. Each of the corner portions 472 outwardly protrudes as compared to a square shape (indicated by a two-dot chain line in the drawings) formed by extensions of the side portions 471, 472 . . . . The overall shape of each of the corner portions 472 is a bell shape. At least an apex portion 472a of each corner portion 472 which most outwardly protrudes, and foot portions 472b, 472b of the corner portion 472 at which the side portions 471, 471 are connected together are formed by curves. The apex portion 472a is curved to be raised toward the outside of the dust-proof sheet 470. Each of the foot portions 472b is curved to be recessed toward the inside of the dust-proof sheet 470. In the above-described manner, each of the corner portions 472 is formed so that the side portions 471, 471 are smoothly connected, and the corner portion 472 itself is formed by a smooth curve.

The shielding structure 4 includes the case 410, the lid 420, and the dust-proof sheet 470 configured in the above-described manner. The shielding structure 4 will be described in detail below.

The dust-proof sheet 470 is placed at a position to cover the opening portion 411 of the case 410 and, with the dust-proof sheet 470 held in the above-described state, the lid 420 is attached to the case 410. In this state, the dust-proof sheet 470 is pressed against the opening edge 411a of the opening portion 411 of the case 410 by a recess portion 423 of the 420 and is deformed so that a central portion of the dust-proof sheet 470 which the recess portion 423 contacts inwardly protrudes in the case 410 as compared to the peripheral portion thereof. At this time, the corner portions 413, 413 . . . outwardly protrude, and a space in which the dust-proof sheet 470 spreads out with no wrinkle formed is ensured. Thus, wrinkles in the dust-proof sheet 470 can be reduced. As a result, a gap between the dust-proof sheet 470 and the opening portion 411 of the case 410 can be prevented or reduced.

<<Other Embodiments>>

Each of the above-described embodiments may have following configuration.

The shape of the opening edge 150a of the first opening portion 150 is not limited to a substantially quadrangular shape. The opening edge 150a may have a substantially polygonal shape and, for example, may have a substantially triangular shape, a substantially pentagonal shape, and a substantially hexagonal shape, etc. In that case, the dust-proof sheet 170 is formed to have the same substantially polygonal shape as that of the opening edge 150a (i.e., a substantially polygonal shape with the same number of corners as that of the number of corners of the opening edge 150a). That is, when the opening edge 150a has a substantially hexagonal shape, the dust-proof sheet 170 has a substantially hexagonal shape. The term a "substantially polygonal shape" as used herein does not strictly mean a polygonal shape whose sides are substantially straight, and does not strictly mean that each corner portion of a substantially polygonal shape is angular (i.e., may be rounded).

Each of the side portions of the opening edge 150a of the first opening portion 150 and the dust-proof sheet 170 is not limited to a straight line. Each of the side portions may be formed to be a substantially straight line, which may be slightly curved or bent.

Figure 16:
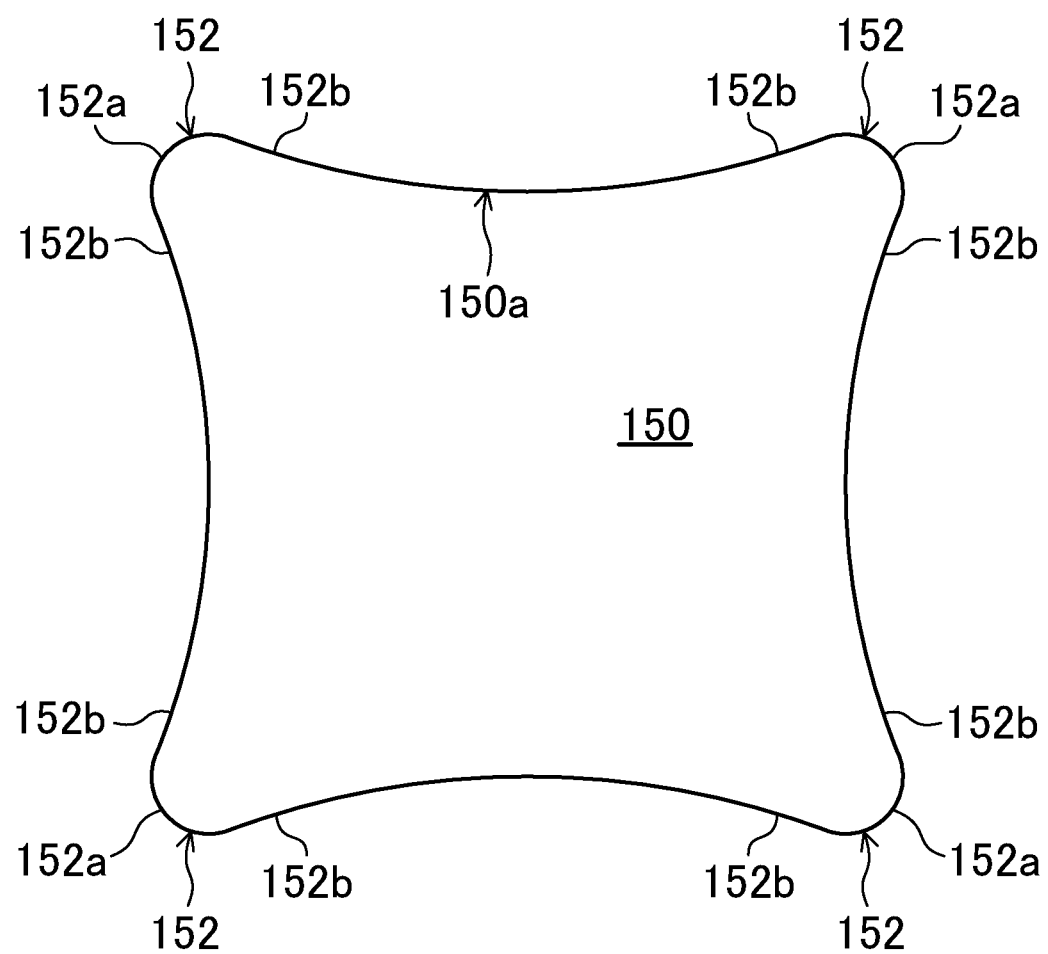
FIG. 16 is a front view of a first opening portion according to a first variation.

Furthermore, the opening edge 150a of the first opening portion 150 may be formed so that side portions and foot portions of corner portions cannot be clearly distinguished. For example, as shown in FIG. 16, the foot portion 152b of one of two adjacent corner portions 152, 152, the long side portion 151a (151c) or the short side portion 151b (151d), and the foot portion 152b of the other one of the two adjacent corner portions 152, 512 may be formed as a continuous curve. In this case, it can be considered that the side portions are omitted, or that the side portions are formed by curves and integrated with the foot portions 152b, 152b.

The opening edge 150a of the first opening portion 150 is formed so that all of the corner portions 152, 152 . . . outwardly protrude, but the shape of the opening edge 150a is not limited thereto. That is, as long as the opening edge 150a of the first opening portion 150 is formed so that at least one of the corner portions 152 outwardly protrudes, wrinkles in the dust-proof sheet 170 can be reduced at the corner portion 152. In that case, the dust-proof sheet 170 is formed so that one of the corner portions of the dust-proof sheet 170 corresponding to the at least one of the corner portions 152 which outwardly protrudes outwardly protrudes.

Furthermore, the corner portions 152, 152 . . . of the first opening portion 150 all have the same shape. However, all of the corner portions 152, 152 . . . do not have to have the same shape. Also, the corner portions of the dust-proof sheet 170 all have the same shape. However, all of the dust-proof sheet 170 do not have to have the same shape.

Figure 17:
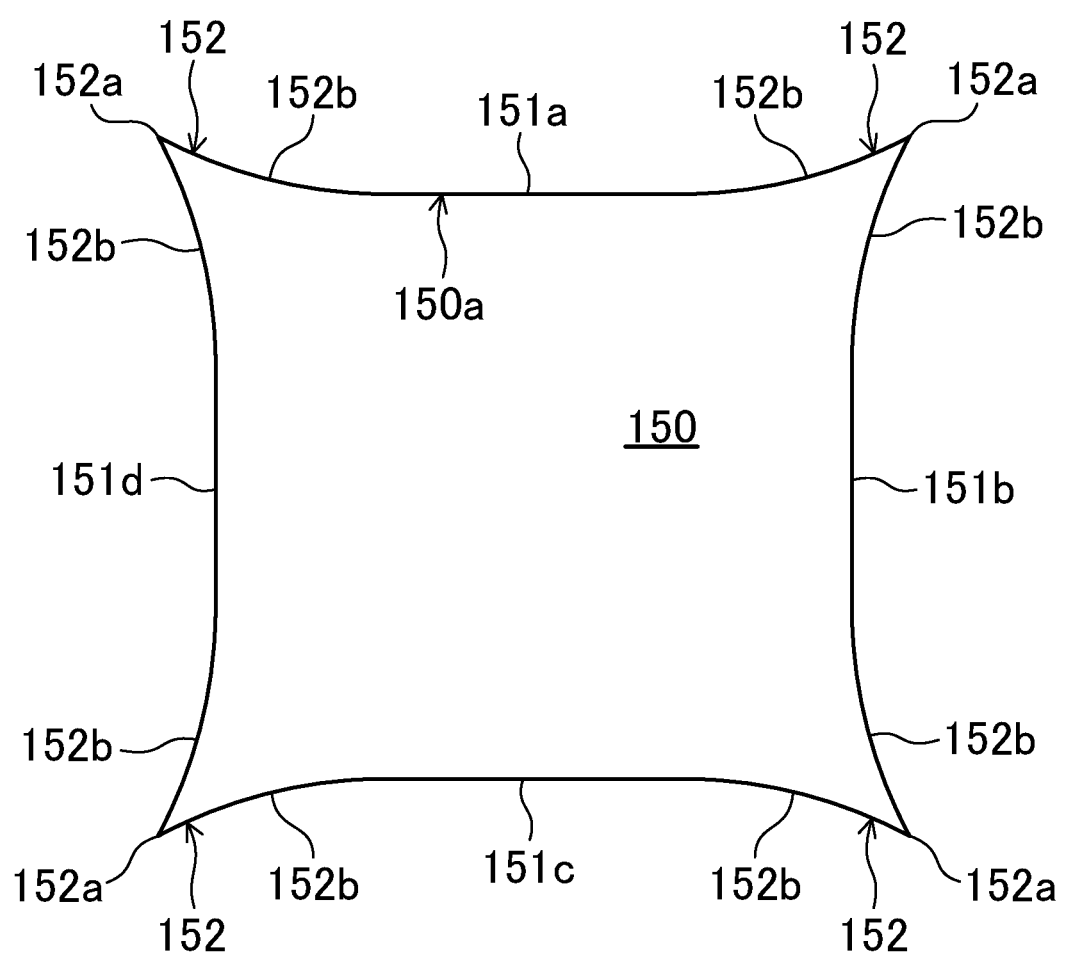
FIG. 17 is a front view of a first opening portion according to a second variation.
Figure 18:
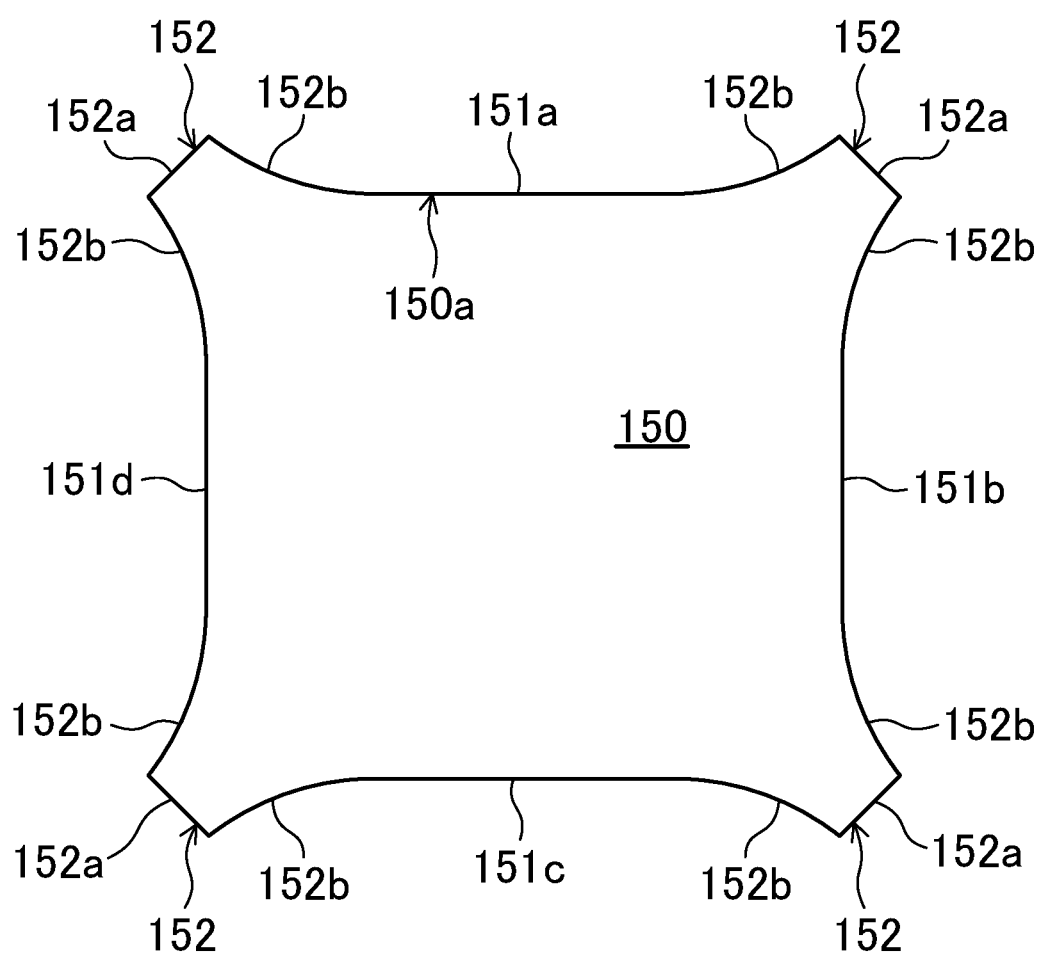
FIG. 18 is a front view of a first opening portion according to a third variation.

Furthermore, each of the corner portions 152 is formed so that the apex portion 152a and the foot portions 152b, 152b are formed by curves. However, the shape of each of the corner portions 152 is not limited thereto. At least one of the apex portion 152a and the foot portions 152b, 152b may be formed by a folding point of a polygonal line or a straight line segment. For example, as shown in FIG. 17, each of the apex portions 152a may be formed by an endpoint (i.e., a folding point of a polygonal line) at which two curves are connected. Also, as shown in FIG. 18, each of the apex portions 152a may be formed by a straight line segment. Furthermore, as shown in FIG. 19, each of the foot portions 152b, 152b may be formed by a straight line segment. Note that, as described above, each of the apex portion 152a and the foot portions 152b, 152b is preferably formed by a curve in view of providing a close contact between the dust-proof sheet 170 and the opening edge 150a of the first opening portion 150.

In each of the above-described embodiments, the opening edge 150a of the first opening portion 150 and the outer circumference shape of the dust-proof sheet 170 are substantially similar to each other, but the opening edge 150a and the outer circumference shape of the dust-proof sheet 170 are not limited thereto. The side portions of the opening edge 150a and the side portions of the dust-proof sheet 170 do not have to have the same shape, and the corner portions of the opening edge 150a and the corner portions of the dust-proof sheet 170 do not have to have the same shape. The dust-proof sheet 170 does not have to have a shape with corner portions which outwardly protrude, and furthermore, the dust-proof sheet 170 does not have to have a substantially polygonal shape. Note that the dust-proof sheet 170 preferably has a substantially polygonal outer circumference with the same number of corner portions as that of the opening edge 150a of the first opening portion 150, and the corner portions of the dust-proof sheet 170 corresponding to the corner portions of the opening edge 150a which outwardly protrudes preferably protrudes outwardly.

The opening edge 150a of the first opening portion 150 and the dust-proof sheet 170 have been described above. The opening portion 411 and the dust-proof sheet 470 are also formed in the same manner as described above.

Each of the dust-proof sheets 170 and 470 is made of an elastic, light-blocking plastic thin plate. However, a material of each of the dust-proof sheets 170 and 470 is not limited to that in the above-described embodiments.

Furthermore, the configuration in which each of the imaging devices 110 and 310 is provided to be directly or indirectly attached to the master flange 155 is not limited to the above-described embodiments. As long as each of the imaging devices 110 and 310 is provided to be directly or indirectly attached to the master flange 155, any configuration can be employed.

In each of the above-described embodiments, an example in which a shielding structure is used as an imaging device support structure in the lens barrel 100 has been described. However, the present disclosure may be used for a shielding structure for some other equipment. For example, the above-described configuration may be employed for a shielding structure such as a display section or an operation section, etc. provided in a case of an electronic device. That is, an electronic device is configured so that, in the electronic device, a predetermined opening portion is provided in a case, and a display section and an operation section are exposed through the opening portion to the outside. In this case, a gap is formed between an opening edge of the opening portion and the display section or the operation section. The gap may be shielded by the dust-proof sheet 170 or 470. For example, a configuration in which the dust-proof sheet is attached to the display section or the operation section and the dust-proof sheet is pressed against an opening edge of the opening portion of the case from the inside may be employed.

According to the present disclosure, entrance of a foreign substance such as dust and dirt from the outside can be prevented or reduced, and therefore, the present disclosure is useful for devices having various shielding structures.

It will be appreciated by those of ordinary skill in the art that the invention is not limited to any one of the foregoing embodiments and can be embodied in other specific forms without departing from the spirit or essential character thereof. The above-described embodiments are merely examples in all respects and must not be construed to limit the invention. The scope of the present invention is defined by the scope of the appended claims and is not limited at all by the specific description of this specification. Furthermore, all the modifications and changes belonging to equivalents of the claims are considered to fall within the scope of the present invention.

What is claimed is:

1. A shielding structure, comprising:
   a first member having an opening portion;
   a second member; and a shielding member which shields a gap between an opening edge of the opening portion and the second member,
wherein
a second member presses a part of the shielding member located inside the opening portion toward the first member,
the opening edge of the opening portion has at least two side portions and a corner portion connecting the side portions, and
the corner portion outwardly protrudes beyond a corner formed by extensions of the side portions.

2. The shielding structure of claim 1, wherein
the side portions of the opening edge of the opening portion are straight and correspond to sides of a polygonal shape, and
parts of the corner portion connected to the side portions are formed by curves.

3. The shielding member of claim 1, wherein
parts of the corner portion which most outwardly protrude are formed by curves.

4. The shielding structure of claim 1, wherein
the shielding member has at least two side portions and a corner portion connecting the side portions, and
the corner portion outwardly protrudes beyond a corner formed by extensions of the side portions.

5. An imaging device support structure, comprising:
a master flange having an opening portion through which an optical axis passes;
an imaging device which is directly or indirectly attached to the master flange and is positioned in the opening portion as viewed in a direction of the optical axis; and
a shielding member which shields a gap between the master flange and the imaging device in the opening portion,
wherein
the shielding member is pressed against an opening edge of the opening portion along the direction of the optical axis,
the opening edge of the opening portion has at least two side portions and a corner portion connecting the side portions, and
the corner portion outwardly protrudes beyond a corner formed by extensions of the side portions.

6. The imaging device support structure of claim 5, wherein
the side portions of the opening edge of the opening portion are straight and correspond to sides of a polygonal shape, and
parts of the corner portion connected to the side portions are formed by curves.

7. The imaging device support structure of claim 5, wherein
parts of the corner portion which most outwardly protrude are formed by curves.

8. The imaging device support structure of claim 5, wherein
the shielding member has at least two side portions and a corner portion connecting the side portions, and
the corner portion outwardly protrudes beyond a corner formed by extensions of the side portions.

9. The imaging device support structure of claim 5, further comprising:
a tilt adjustment mechanism capable of adjusting a tilt of the imaging device relative to the master flange.

10. An imaging device support structure, comprising:
a master flange having an opening portion through which an optical axis passes;
an attachment member attached to the master flange;
an imaging device which is attached to the attachment member and is positioned in the opening portion as viewed in a direction of the optical axis; and
a shielding member which shields a gap between the master flange and the attachment member in the opening portion,
wherein
the shielding member is pressed against an opening edge of the opening portion along the direction of the optical axis,
the opening edge of the opening portion has at least two side portions and a corner portion connecting the side portions, and
the corner portion outwardly protrudes beyond a corner formed by extensions of the side portions.

11. The imaging device support structure of claim 10, wherein
the side portions of the opening edge of the opening portion are straight and correspond to sides of a polygonal shape, and
parts of the corner portion connected to the side portions are formed by curves.

12. The imaging device support structure of claim 10, wherein
parts of the corner portion which most outwardly protrude are formed by curves.

13. The imaging device support structure of claim 10, wherein
the shielding member has at least two side portions and a corner portion connecting the side portions, and
the corner portion outwardly protrudes beyond a corner formed by extensions of the side portions.

14. The imaging device support structure of claim 10, further comprising:
a tilt adjustment mechanism capable of adjusting a tilt of the imaging device relative to the master flange.

* * * * *

UNITED STATES PATENT AND TRADEMARK OFFICE
CERTIFICATE OF CORRECTION

| | | |
|---|---|---|
| PATENT NO. | : 8,742,324 B2 | Page 1 of 1 |
| APPLICATION NO. | : 13/158591 | |
| DATED | : June 3, 2014 | |
| INVENTOR(S) | : Hiroyasu Fujinaka | |

It is certified that error appears in the above-identified patent and that said Letters Patent is hereby corrected as shown below:

On the title page item (30), under "Foreign Application Priority Data",
"May 27, 2011 (JP)...2011-119593" should be deleted.

Signed and Sealed this
Sixteenth Day of September, 2014

Michelle K. Lee
*Deputy Director of the United States Patent and Trademark Office*